(No Model.)
H. E. SKINNER.
TROLLING SPOON.
No. 435,026. Patented Aug. 26, 1890.
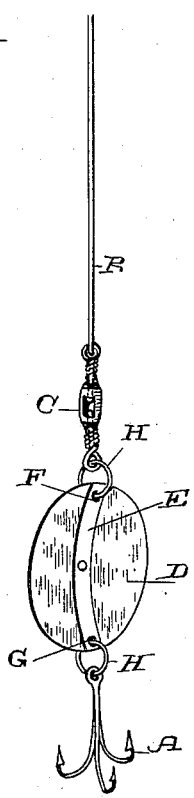
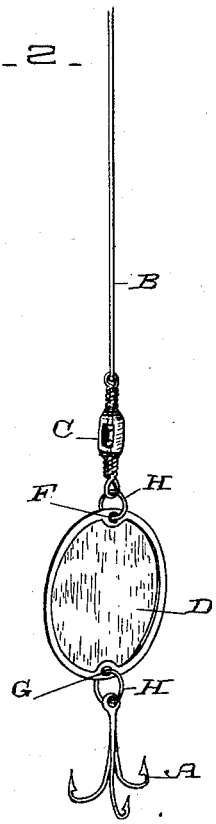
Witnesses,
Geo. H. Strong
J. L. Torree
Inventor,
Henry E. Skinner
By Dewey & Co.
Attys

UNITED STATES PATENT OFFICE.

HENRY E. SKINNER, OF SAN FRANCISCO, CALIFORNIA, ASSIGNOR TO EDWARD T. ALLEN, OF SAME PLACE.

TROLLING-SPOON.

SPECIFICATION forming part of Letters Patent No. 435,026, dated August 26, 1890.

Application filed June 11, 1890. Serial No. 355,076. (No model.)

*To all whom it may concern:*

Be it known that I, HENRY E. SKINNER, a citizen of the United States, residing in the city and county of San Francisco, State of California, have invented an Improvement in Trolling-Spoons; and I hereby declare the following to be a full, clear, and exact description of the same.

My invention relates to an improvement in what are known as "trolling-spoons."

It consists of a spoon formed of a naturally-iridescent shell or substance and a strengthening-bar attached to said spoon having devices by which its opposite ends are connected, respectively, with the hooks and the line.

Referring to the accompanying drawings for a more complete explanation of my invention, Figure 1 is a view of my improved spoon and attachment. Fig. 2 is a modification showing a band around the periphery.

In the manufacture of trolling-spoons it is customary to employ highly-polished nickel, silver, or otherwise coated metal, and the hooks are suspended at one end, while the line is connected by a swivel-joint with the opposite end. These spoons naturally become easily tarnished and lose their effectiveness. Iridescent shells have also sometimes been used for this purpose, but they are of an exceedingly brittle and friable nature and have not sufficient strength to form a proper connection between the hooks and the swivel to which the line is attached.

In my invention, A are the hooks, B the line, and C the swivel-joint, which is connected with the end of the spoon D opposite to the hooks, these latter being connected with one end of the spoon and the line with the other, as shown. The spoon D, I make of mother-of-pearl, abalone-shell, or other naturally-iridescent substance the surface of which is not capable of being tarnished by the action of water or air. These substances are not naturally strong enough to resist the strain brought upon the line by a heavy fish, and I strengthen the spoon by a re-enforce of metal, which may be fixed to the spoon in various ways, either as a tip at each end, a band around the periphery, like a spectacle-bow, or a narrow strip extending through the center from end to end, either inside or outside, as may be preferred. Through the ends of the strip E are made holes at F and G, respectively, and corresponding holes are also made through the ends of the shell of which the spoon is formed. Through these holes the rings or links H are introduced, and the hooks are fixed to the ring at one end and the swivel is connected with the ring at the opposite end. By the use of this re-enforcing strip or bar I provide a sufficiently strong connection between the swivel and the hooks, and it is so small and narrow that even if it becomes tarnished it does not materially affect the use of the spoon, which, being composed of the iridescent shell or material, will always retain its bright appearance and surface.

Having thus described my invention, what I claim as new, and desire to secure by Letters Patent, is—

1. A trolling-spoon composed of iridescent shell or similar material, in combination with a metal strengthening strip or bar secured to the spoon and having holes made in opposite ends for the attachment of the hooks and the swivel, respectively, substantially as herein described.

2. A trolling-spoon consisting of the iridescent shell or other similar material having the hooks attached at one end and the swivel and line connected with the other, in combination with the re-enforcing bar or strip secured to the spoon and having its opposite ends perforated for the connection of the hook and swivel, substantially as herein described.

In witness whereof I have hereunto set my hand.

HENRY E. SKINNER.

Witnesses:
GEO. H. STRONG,
S. H. NOURSE.